United States Patent
Smith et al.

(10) Patent No.: US 9,457,841 B2
(45) Date of Patent: Oct. 4, 2016

(54) DRIVE SYSTEM WITH SERIALLY ARRANGED VARIABLE DISPLACEMENT COMPONENTRY

(71) Applicants: Brent A Smith, Peosta, IA (US); Mark E Hull, Peosta, IA (US); Nathan J Horstman, Durango, IA (US); Jeffrey A Bauer, Dubuque, IA (US); Trent A Luoma, Dubuque, IA (US); Neil V Harber, Holy Cross, IA (US)

(72) Inventors: Brent A Smith, Peosta, IA (US); Mark E Hull, Peosta, IA (US); Nathan J Horstman, Durango, IA (US); Jeffrey A Bauer, Dubuque, IA (US); Trent A Luoma, Dubuque, IA (US); Neil V Harber, Holy Cross, IA (US)

(73) Assignee: DEERE & COMPANY, Moline, IL (US)

( * ) Notice: Subject to any disclaimer, the term of this patent is extended or adjusted under 35 U.S.C. 154(b) by 147 days.

(21) Appl. No.: 14/286,559

(22) Filed: May 23, 2014

(65) Prior Publication Data

US 2015/0336609 A1    Nov. 26, 2015

(51) Int. Cl.
| | |
|---|---|
| *A01B 69/00* | (2006.01) |
| *B62D 11/00* | (2006.01) |
| *B63G 8/24* | (2006.01) |
| *B63H 25/04* | (2006.01) |
| *G05D 1/00* | (2006.01) |
| *G06F 7/00* | (2006.01) |
| *G06F 19/00* | (2011.01) |
| *B62D 12/00* | (2006.01) |
| *F16H 61/47* | (2010.01) |
| *B62D 9/00* | (2006.01) |
| *B60K 17/356* | (2006.01) |
| *F16H 61/421* | (2010.01) |
| *F16H 61/431* | (2010.01) |
| *F16H 61/44* | (2006.01) |

(52) U.S. Cl.
CPC .............. *B62D 12/00* (2013.01); *B60K 17/356* (2013.01); *B62D 9/002* (2013.01); *F16H 61/421* (2013.01); *F16H 61/431* (2013.01); *F16H 61/44* (2013.01); *F16H 61/47* (2013.01); *B60Y 2200/411* (2013.01)

(58) Field of Classification Search
CPC ...... B62D 11/005; B62D 12/00; F16H 61/47
USPC .......................................................... 701/41
See application file for complete search history.

(56) References Cited

U.S. PATENT DOCUMENTS

| | | |
|---|---|---|
| 4,177,870 A | 12/1979 | Henn |
| 6,321,866 B1 | 11/2001 | Prohaska |

(Continued)

FOREIGN PATENT DOCUMENTS

WO    2009146922 A1    12/2009

*Primary Examiner* — Maceeh Anwari
(74) *Attorney, Agent, or Firm* — Taft Stettinius & Hollister LLP; Stephen F. Rost

(57) ABSTRACT

A vehicle and drive system control method for a vehicle including first and second traction elements coupled to the vehicle, a variable displacement pump, a bi-directional variable displacement first motor coupled to the first traction element, and a bi-directional second motor coupled to the second traction element. The pump, and first and second motors are coupled fluidly in series with one another. A control unit can determine a desired speed for the traction elements, and determine pump, first and/or second motor displacements based on the desired speed. First and second speed sensors can sense output speeds of the motors, and the pump, first and/or second motor displacements can be determined based on the motor output speeds. Articulation and steering sensor signals can also be used to determine pump, first and/or second motor displacements.

17 Claims, 3 Drawing Sheets

(56) References Cited

U.S. PATENT DOCUMENTS

| | | |
|---|---|---|
| 2006/0042838 A1 | 3/2006 | Yeoman |
| 2006/0042839 A1 | 3/2006 | Iwaki |
| 2009/0173068 A1 | 7/2009 | Sakakura |
| 2010/0307843 A1 | 12/2010 | Lawson |
| 2013/0013158 A1* | 1/2013 | Weber .................. F16H 61/435 701/50 |

* cited by examiner

DRIVE SYSTEM WITH SERIALLY ARRANGED VARIABLE DISPLACEMENT COMPONENTRY

FIELD OF THE DISCLOSURE

The present disclosure relates to a vehicle and a drive control system for a vehicle where the vehicle includes variable displacement components coupled fluidly in series with one another.

BACKGROUND OF THE DISCLOSURE

A motor grader is an articulated vehicle that has a front section and a rear section. The front and rear sections are articulated to one another. The front section has a left front wheel and a right front wheel, the front wheels coupled respectively to opposite ends of an axle so as to be positioned on opposite sides of a fore-aft axis of the motor grader and steerable relative to the axle. The rear section has four wheels, two on each side in a tandem arrangement.

A variety of drive systems may be used to propel a motor grader. For example, there are front-and-rear-wheel-drive (FWD-and-RWD) systems (e.g., all-wheel drive or less than all-wheel drive), front-wheel-drive (FWD) systems, and rear-wheel-drive (RWD) systems. A typical drive system for a motor grader allows operation of the motor grader in a FWD-and-RWD mode, a FWD-only mode (may also be referred to as "precision mode"), or a RWD-only mode. It is known for the RWD system of a motor grader to be a direct drive system between the engine and the rear wheels, while the FWD system is hydrostatically driven (and thus variable).

The drive system of the motor grader may be switched between these modes. The FWD-and-RWD mode generally provides maximum tractive effort useful, for example, in sloppy conditions or other traction-reducing conditions. The FWD-only mode allows operation of the motor grader at reduced speeds (relative to the direct drive system of the rear section) which may be particularly useful for maneuvering in relatively tight areas (e.g., in a cul-de-sac), fine grading, and milling through pavement, to name but a few possible uses. RWD-only mode may be useful where fuel economy is of interest.

It is known for the FWD system of a motor grader to have two hydrostatic transmissions, one for each of the front wheels. In particular, a first hydrostatic transmission drives one of the front wheels, and a second hydrostatic transmission drives the other front wheel. Each hydrostatic transmission has a hydraulic rotary bi-directional variable displacement pump and a hydraulic rotary two-speed motor coupled fluidly in series with the pump (i.e., each motor has two selectable displacement settings). A clutch is positioned between each motor and a respective final drive coupled to a respective front wheel. An electro-hydraulic engagement valve is coupled to each clutch so as to engage the clutch to operatively connect the motor to the final drive when the solenoid of the engagement valve is energized.

SUMMARY OF THE DISCLOSURE

In one embodiment of the present disclosure, a drive system comprises first and second traction elements, a variable displacement pump, a bi-directional variable displacement first motor, and a bi-directional second motor. The first and second traction elements can be coupled to opposite ends of an axle and steerable relative to the axle. The first and second motors are operably coupled respectively to the first and second traction elements. The pump and the first and second motors are coupled fluidly in series with one another.

In such a case, the series connection may provide the same flow rate through the first and second motors, promoting speed matching between the motors, and operating both traction elements even if one loses traction. Compared to a system with two hydrostatic transmissions, the series connection would have fewer parts (e.g., no engagement valve, eliminate a pump) providing better reliability, would be lighter in weight for less of a footprint during, for example, articulation and turning, and would be a smaller package. Further, in the series connection all the hydraulic oil would pass through both motors forcing both motors to turn, whereas, with respect to parallel motors, in a slip condition the oil would take the path of least resistance potentially resulting in a loss of tractive ability by a slipping traction element.

In some embodiments, only one of the motors has a variable displacement, whereas in other embodiments both motors have a variable displacement. Some vehicles may have more than two bi-directional motors coupled fluidly in series with one another and the pump (e.g., a turf mower having three ground-engaging wheels may have three such motors, a respective one for each wheel). In such a case, one or more of the motors may have a variable displacement.

A vehicle is disclosed that includes first and second traction elements coupled to the vehicle, a variable displacement pump, a bi-directional variable displacement first motor operably coupled to the first traction element, and a bi-directional second motor operably coupled to the second traction element. The pump, and the first and second motors are coupled fluidly in series with one another. The second motor can be a fixed or variable displacement motor. The pump can be a bi-directional pump. Alternatively, the pump can be a uni-directional pump that effectively reverses direction using a valve. The pump, and the first and second motors can be part of a hydrostatic transmission.

The vehicle can also include a control unit that receives one or more input signals, determines a desired speed for the first and second traction elements based on the input signals, determines a pump displacement for the pump based on the desired speed, determines a first motor displacement for the first motor and/or a second motor displacement for the second motor based on the desired speed, and outputs a pump control signal commanding the pump to the determined pump displacement, and a first motor control signal commanding the first motor to the determined first motor displacement and/or a second motor control signal commanding the second motor to the determined second motor displacement.

The vehicle can also include a steering sensor for sensing a first steering angle indicative of a steering angle of the first traction element: The control unit can determine a second steering angle indicative of a steering angle of the second traction element based on the first steering angle:

The vehicle can also include first and second speed sensors. The first speed sensor can sense a rotational output speed of the first motor and generate a first motor speed signal indicative of the output speed of the first motor. The second speed sensor can sense a rotational output speed of the second motor and generate a second motor speed signal indicative of the output speed of the second motor. The control unit can receive the first and second motor speed signals; and determine the pump displacement, and the first and/or second motor displacements based on the first and second motor speed signals. The control unit can determine an average motor speed based on the first and second motor speed signals, and determine the pump control signal based on the average motor speed. The control unit can determine a speed differential based on the first and second motor speed signals, and determine the first and/or second motor control signals based on the speed differential.

The vehicle can be an articulated vehicle comprising a front section and a rear section, where the rear section is articulated relative to the front section, and an axle is coupled to the front section. The first and second traction elements can be coupled to opposite ends of the axle, and both traction elements can be steerable relative to the axle. In this articulated embodiment, the vehicle can also include an articulation sensor and a steering sensor. The articulation sensor can sense an articulation angle between the front section of the vehicle and the rear section of the vehicle, and generate an articulation signal indicative of the articulation angle. The steering sensor can sense a steering angle of the first or second traction element, and generate a steering signal indicative of the steering angle. The control unit can receive the articulation and steering signals; determine a first ratio between a turning radius of the first traction element and a turning radius of the rear section based on the articulation and steering signals; determine a second ratio between a turning radius of the second traction element and a turning radius of the rear section based on the articulation and steering signals; and determine the first and/or second motor displacements based on the first and second ratios respectively. The control unit can determine the first motor displacement based on a product of the desired speed and the first ratio, and/or determine the second motor displacement based on a product of the desired speed and the second ratio. The vehicle can also include a first speed sensor that generates a first motor speed signal indicative of an output speed of the first motor, and a second speed sensor that generates a second motor speed signal indicative of an output speed of the second motor. The control unit can determine a second motor displacement for the second motor based on the desired speed, and output a second motor control signal commanding the second motor to the determined second motor displacement. The control unit can also receive the first and second motor speed signals, determine a first speed setpoint based on a product of the desired speed and the first ratio, determine the first motor displacement based on a difference between the first speed setpoint and the output speed of the first motor, determine a second speed setpoint based on a product of the desired speed and the second ratio, and determine the second motor displacement based on a difference between the second speed setpoint and the output speed of the second motor.

A control method is disclosed for a vehicle drive system, where the vehicle includes first and second traction elements coupled to the vehicle, a variable displacement pump, a bi-directional variable displacement first motor operably coupled to the first traction element, and a bi-directional second motor operably coupled to the second traction element. The pump, and the first and second motors are coupled fluidly in series with one another. The control method includes receiving one or more input signals; determining a desired speed for the first and second traction elements based on the input signals; determining a pump displacement for the pump based on the desired speed; determining a first motor displacement for the first motor based on the desired speed, and outputting a pump control signal commanding the pump to the determined pump displacement, and a first motor control signal commanding the first motor to the determined first motor displacement. The control method can also include determining a second motor displacement for the second motor based on the desired speed, and outputting a second motor control signal commanding the second motor to the determined second motor displacement.

The control method can also include receiving a first steering signal indicative of a steering angle of the first traction element; and determining a second steering angle indicative of a steering angle of the second traction element based on the first steering signal:

The control method can also include sensing a rotational output speed of the first motor; generating a first motor speed signal indicative of the output speed of the first motor, sensing a rotational output speed of the second motor; generating a second motor speed signal indicative of the output speed of the second motor, and determining the pump displacement, and the first and/or second motor displacements based on the first and second motor speed signals. The control method can also include determining an average motor speed based on the first and second motor speed signals; and determining the pump control signal based on the average motor speed. The control method can also include determining a speed differential based on the first and second motor speed signals; and determining the first and/or second motor control signals based on the speed differential.

The vehicle can be an articulated vehicle that includes a front section and a rear section, the rear section being articulated to the front section. The vehicle can also include an axle coupled to the front section, the first and second traction elements being coupled to opposite ends of the axle and steerably coupled to one another. For an articulated vehicle, the control method can also include sensing an articulation angle between the front section of the vehicle and the rear section of the vehicle, generating an articulation signal indicative of the articulation angle; sensing a steering angle of the first or second traction element, generating a steering signal indicative of the steering angle, determining a first ratio between a turning radius of the first traction element and a turning radius of the rear section based on the articulation and steering signals, determining the first motor displacement based on the first ratio, determining a second ratio between a turning radius of the second traction element and a turning radius of the rear section based on the articulation and steering signals, and determining the second motor displacement based on the second ratio. The control method can also include determining the first motor displacement based on a product of the desired speed and the first ratio, and determining the second motor displacement based on a product of the desired speed and the second ratio. The control method can also include receiving a first motor speed signal indicative of an output speed of the first motor; receiving a second motor speed signal indicative of an output speed of the second motor; determining a first speed setpoint based on a product of the desired speed and the first ratio; determining the first motor displacement based on a difference between the first speed setpoint and the output speed of the first motor; determining a second speed setpoint based on a product of the desired speed and the second ratio; and determining the second motor displacement based on a difference between the second speed setpoint and the output speed of the second motor.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
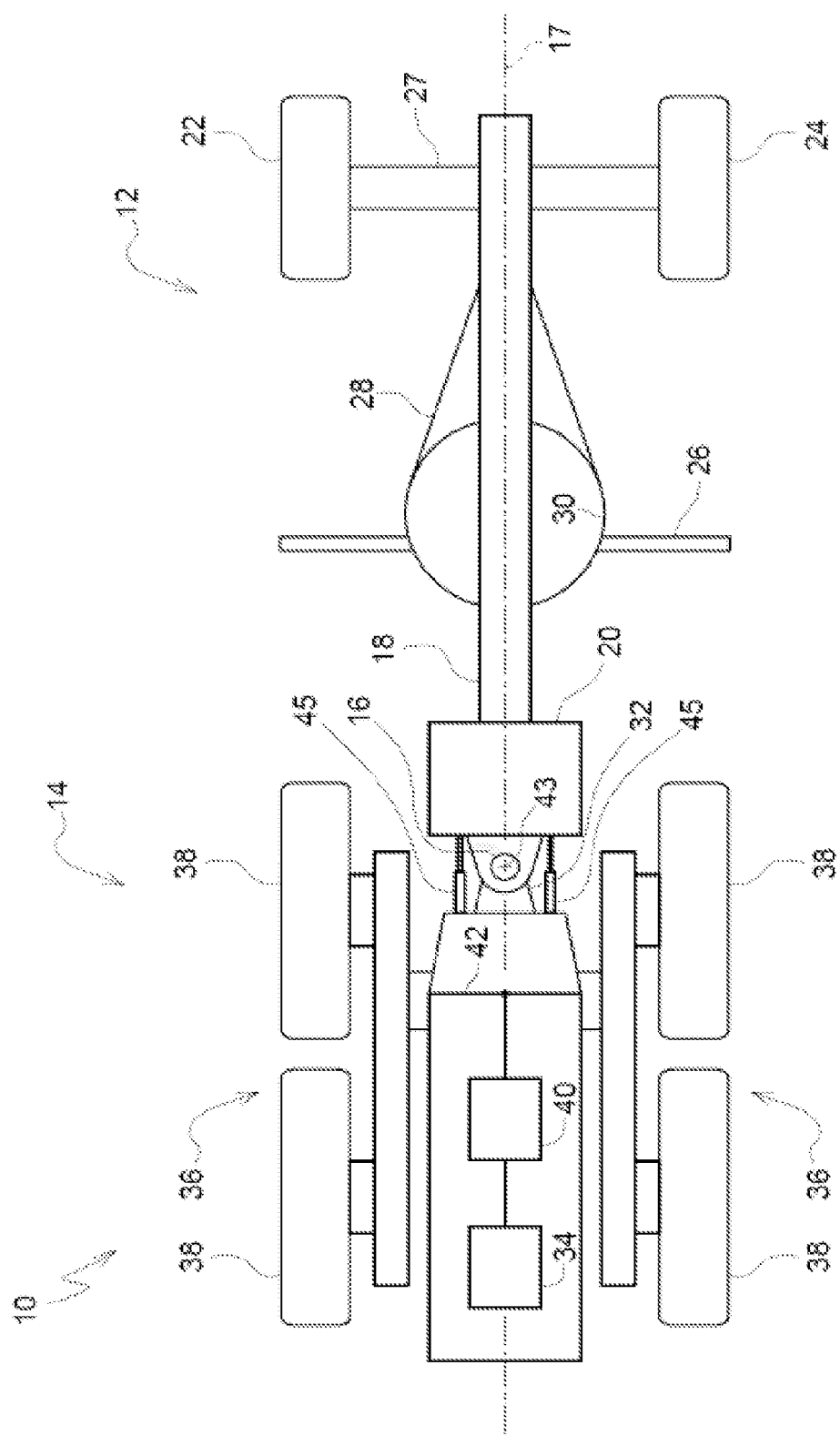
FIG. 1 is a top diagrammatic view of an exemplary vehicle in the form of a motor grader.

FIG. 1 illustrates an exemplary vehicle 10 which is in the form of a motor grader. The vehicle 10 may thus be an articulated vehicle having a first or front section 12 and a second or rear section 14, the front and rear sections 12, 14 are articulated to one another at an articulation joint 16. FIG. 1 shows a laterally central fore-aft axis 17 extending though the front section 12 and rear section 14 of the vehicle 10. The terms "left" and "right" are used relative to the fore-aft axis 17, and associated with components on laterally opposite sides of the fore-aft axis 17.

The front section 12 has a main frame 18 and a human operator's station 20 supported on the main frame 18. From the human operator's station 20, a human operator can control the vehicle 10, a rotary first or left traction element 22, a rotary second or right traction element 24, and a moldboard 26 mounted to the main frame 18 and configured for moving earthen or other material. The left and right traction elements 22, 24 are coupled respectively to opposite ends of a front axle 27 and are steerable relative to the axle 27. The traction elements 22, 24 may be propelled, steered, and leaned hydraulically.

A draft frame 28 is coupled to the main frame 18, and a circle frame 30 is coupled to the draft frame 28 to rotate relative thereto. The moldboard 26 can be coupled to the draft frame 28 by a tilt frame to allow movement of the moldboard 26 in a number of directions. A saddle and other components known in the art can be mounted to the main frame 18 for raising, lowering and shifting the moldboard 26 relative to the main frame 18.

The rear section 14 has an engine frame 32, an internal combustion engine 34 in the form of, for example, a diesel engine, and a tandem 36 on each side of the vehicle 10. The engine 34 is mounted to the engine frame 32. Each of the left and right tandems 36 has two rotary traction elements 38 (fore and aft traction elements) driven by the engine 34 of the vehicle 10 via a direct drive. The direct drive includes a mechanical transmission 40 driven by the engine 34, a rear axle 42, a drive shaft coupled to a propel output shaft of the transmission and a differential of the rear axle 42 therebetween (the differential allows rear traction elements 38 on opposite sides of the vehicle 10 to rotate at different speeds during turning), a chain drive of each tandem 36, and two final drives of each tandem 36 (fore and aft final drives) coupled respectively to each rear traction element 38 and the respective chain drive. Each chain drive of each tandem 36 has two chains, each of which extends between the rear axle 42 and the respective final drive. The rear section 14 thus has four of the six traction elements of the vehicle 10. Each of the traction elements 22, 24, 38 is configured, for example, as a traction wheel (e.g., a type of tire). In alternative embodiments, these traction elements may be, for example, a track or other type of traction device for a vehicle.

The front and rear sections 12, 14 are articulated to one another. The main frame 18 and the engine frame 32 are articulated to one another at an articulation joint 16 for relative movement between the front and rear sections 12, 14 about an articulation axis 43 using a hydraulic first or left articulation cylinder 45 and a hydraulic second or right articulation cylinder 45. The articulation cylinders 45 are coupled to and extend between the front and rear sections 12, 14.

The front traction elements 22, 24 are coupled to the main frame 18 by use of a front wheel assembly. The front wheel assembly includes the front axle 27, a center portion of which is coupled pivotally (e.g., pinned) to the main frame 18. At opposite ends of the axle 27, a generally C-shaped yoke opening laterally outwardly is coupled pivotally to the axle 27 by use of, for example, a pin for pivotal movement about a yoke axis defined by the pin. The first or left yoke is coupled pivotally to a first or left spindle by use of an upper kingpin and a lower kingpin for steering of the left wheel 22 about a wheel steering axis defined by those kingpins (the left upper and lower kingpins providing a left front wheel steering joint). The second or right yoke is coupled pivotally to a second or right spindle by use of an upper kingpin and a lower kingpin for steering of the right wheel 24 about a wheel steering axis defined by those kingpins (the right upper and lower kingpins providing a right front wheel steering joint). The left and right spindles are fastened respectively to left and right gear-reducing final drives, which are, in turn fastened respectively to the left and right front traction elements 22, 24.

Figure 2:
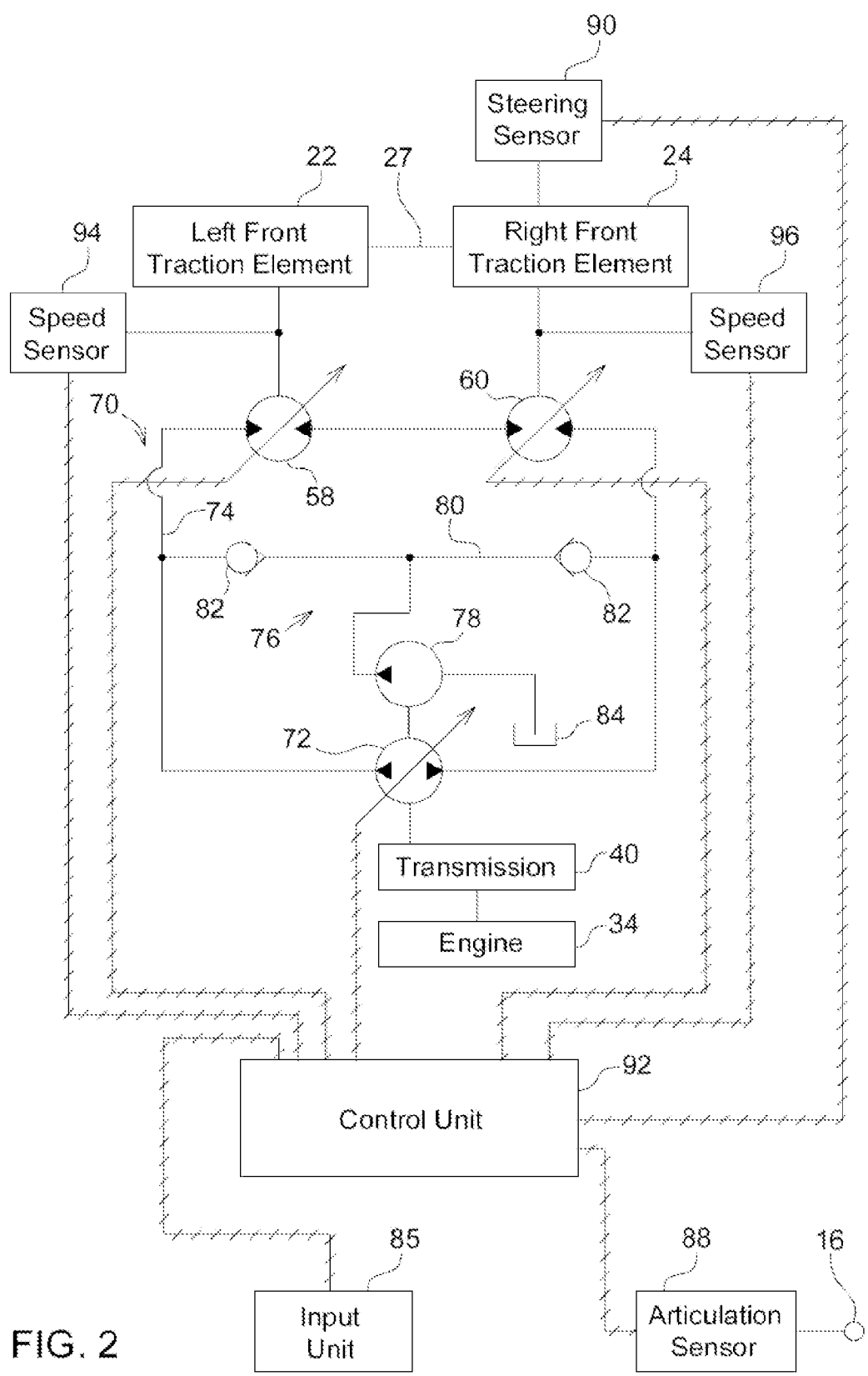
FIG. 2 is a diagrammatic view showing an exemplary drive system of the vehicle.

FIG. 2 illustrates an exemplary drive system for hydraulically driving the traction elements 22, 24 in forward and reverse directions. A hydraulic rotary bi-directional variable displacement first or left motor 58 (e.g., swash plate-type axial piston motor) is mounted to the left spindle and is operably coupled to the left final drive to rotate the left traction element 22. A hydraulic rotary bi-directional variable displacement second or right motor 60 (e.g., swash plate-type axial piston motor) is mounted to the right spindle and is operably coupled to the right final drive to rotate the right traction element 24. The motors 58, 60 are thus operably coupled respectively to the traction elements 22, 24. Operation of the motors 58, 60 is discussed in more detail herein.

The front wheel assembly can include a hydraulic first or left front steering cylinder and a hydraulic second or right front steering cylinder which are configured to steer respectively the left and right front traction elements 22, 24 about their respective steering axes. Each front steering cylinder can be coupled at one end to the axle 27 and at an opposite end to the respective spindle to rotate the respective traction element 22, 24 about its steering axis. A tie rod can be coupled to the left and right spindles for coordinated steering movement of the traction elements 22, 24.

The front wheel assembly can thus be configured such that the left and right traction elements 22, 24 trace out circles of different radii when the traction elements 22, 24 are turned relative to their respective steering-neutral positions about their respective steering axes, discouraging skidding of the front traction elements 22, 24 (compared to if the traction elements 22, 24 were on the same radii). As such, when the left and right traction elements 22, 24 are steered to the left or right about their respective steering axes, the traction elements 22, 24 can assume different steering angles, the inner traction element turning at a greater angle than the outer traction element.

The front traction elements 22, 24 can be configured to lean together relative to neutral. A hydraulic wheel-lean cylinder can be coupled pivotally to the front axle 27 by use of a pin and to the left yoke by use of another pin. The front traction elements 22, 24 can be coupled to one another via a wheel-lean bar which can be coupled pivotally to the upper portion of the left yoke and to the upper portion of the right yoke so as to extend between the yokes. Extension or retraction of the wheel-lean cylinder can thus pivot the left yoke about its axis and the right yoke about its axis via the wheel-lean bar, causing the wheel-lean angle of the traction elements 22, 24 to change.

The embodiment illustrated in FIG. 2 shows a hydraulic rotary bi-directional pump 72 (e.g., swash plate-type axial piston pump), the left motor 58 operably coupled to the left traction element 22, and the right motor 60 operably coupled to the right traction element 24. The pump 72, the left motor 58, and the right motor 60 can be part of a hydrostatic transmission 70. The pump 72 and the left and right motors 58, 60 are arranged in a fluid loop 74 and coupled fluidly in series with one another such that the flow generated by the pump 72 passes through both motors 58, 60 so as to drive both motors 58, 60 with the same flow rate. The pump 72 is, for example, the propel pump for the front-wheel drive of the vehicle 10, and is coupled to the transmission 40 to be driven thereby (e.g., coupled to a first pump output shaft of the transmission 40). The pump 72 can be a bi-directional pump or can be a uni-directional pump that can effectively reverse direction using a valve or other mechanism.

The speed of the engine 34 may be variable in the case of, for example, a direct drive connection in the rear section 14. A throttle input device may be used by the operator to vary the engine speed.

In some embodiments, the engine 34 may be operated at a generally constant engine speed for fuel economy (e.g., 1800 revolutions per minute (rpm) nominally for performance, 1200 rpm for enhanced fuel economy) ("constant engine speed embodiment"). In such a case, the engine 34 may not be connected to the tandems 36 via a direct drive. For example, a torque converter may be interposed between the engine 34 and the transmission 40 or there may be some other non-direct drive configuration for connecting the engine 34 and the tandems 36. The pump 72 can be driven through the transmission 40 at a generally constant rotational speed. There may be fluctuations in the engine speed and thus the pump speed, but for engineering purposes they can be considered constant. In another example, the aforementioned throttle input device may serve as a ground speed input device for inputting a desired ground speed, and another input device may serve as the throttle input device to input selectively one of a number of fixed engine speeds as a desired engine speed. Unless otherwise stated in this detailed description, it will be assumed that the engine 34 is connected to the tandems 36 via a direct drive and that the engine speed is variable via the throttle input device.

The hydrostatic transmission 70 can include a charge circuit 76 coupled fluidly to the loop 74 to provide make-up fluid (e.g., hydraulic oil) due to leakage from the hydrostatic transmission 70. The charge circuit 76 can include a charge pump 78 and a charge line 80 with check valves 82 on either side of the inlet port of the charge line 80. The charge line 80 can be fluidly coupled to the loop 74 at a first outlet port positioned fluidly between the pump 72 and the left motor 58 and at a second outlet port positioned fluidly between the pump 72 and the right motor 60. The charge pump 78 can pump fluid from tank 84 into the charge line 80, and the fluid can flow through the check valves 82 into the loop 74 via the two outlet ports. The charge pump 78 is coupled to the transmission 40 via the pump 72 to be driven by the transmission.

The embodiment of FIG. 2 also shows a control unit 92 electronically coupled to receive inputs from an input unit 85, an articulation sensor 88, a steering sensor 90, a left speed sensor 94 and a right speed sensor 96. The control unit 92 can process the input signals and provide outputs to the pump 72, and the left and right motors 58, 60 which are also electronically coupled to the control unit 92.

The input unit 85 can be configured to generate one or more input signals for use in determining a desired speed for the traction elements 22, 24. The input unit 85 can include, for example, a throttle input device configured to be operated by a human operator to throttle the engine 34 and a sensor configured to sense activation of the throttle input device, both of which can be located in the operator's station 20. The throttle input device can be a proportional input device, and the sensor can be configured to sense the proportional displacement of the throttle input device and to generate a throttle signal in response thereto. The throttle input device can be, for example, an accelerator pedal. In some embodiments, the throttle input device can be a hand throttle (e.g., a rotary knob or a lever movable in opposite directions). The sensor can be, for example, a Hall-effect sensor. In some embodiments, the sensor can be a rotary potentiometer.

The input unit 85 can include a gear shifter, a first shifter sensor, and a second shifter sensor. The gear shifter can be operated by a human operator to select one of a plurality of gear ratios for the transmission 40. The first shifter sensor can be configured to sense if the gear shifter is in forward or reverse and to generate a corresponding forward-reverse signal. The second shifter sensor can be configured to generate a gear signal indicative of the selected gear ratio in response to operation of the shifter. The forward-reverse and gear ratio signals can be inputs to a control unit 92. The gear shifter can be, for example, a lever at the operator's station 20 that is movable to various lever positions, each lever position corresponding to a desired gear ratio (neutral considered as a gear ratio). The first shifter sensor can be configured as a forward switch activated when the shifter is in a forward gear ratio and a reverse switch activated when the shifter is in a reverse gear ratio. The second shifter sensor can be configured as a number of discrete switches each located at a corresponding lever position to determine the position of the shifter. In some embodiments, the gear shifter can be configured as a number of pushbuttons, each corresponding to a respective gear ratio, and the shifter sensor can be configured as a number of corresponding switches actuatable by the pushbuttons. In some embodiments, each of the shifter sensors can be a Hall-effect sensor.

In some embodiments, the input unit 85 can include a transmission speed sensor positioned to sense the rotational speed of the propel output shaft of the transmission 40 for the rear traction elements 38 and to generate a speed signal indicative of that transmission propel output speed (which is indicative of the input speed to the differential of the rear axle 42). That speed signal can be a speed input to the control unit 92 for use in determining the desired speed for the front traction elements 22, 24. The speed sensor can be, for example, a Hall-effect speed sensor. In some embodiments, the speed sensor can be a variable reluctance speed sensor.

The input unit 85 can have an aggressiveness input device (e.g., a dial) at the operator's station 20 by which a human operator can increase or decrease the rotational speed of the front traction elements 22, 24 relative to the rotational speed of the rear traction elements 38 dependent, for example, on operating conditions. For example, if the vehicle 10 is working in sand, where the front traction elements 22, 24 could spin out more easily, it may be desirable for the front traction elements 22, 24 to rotate slower than the rear traction elements 38, in which case the human operator can set the aggressiveness input device at an appropriate aggressiveness setting (e.g., 85%-90% of the speed of the rear traction elements 38). In another example, if the vehicle 10 is working in muddy conditions, it may be beneficial for the front traction elements 22, 24 to rotate faster than the rear traction elements 38, in which case the human operator can set the aggressiveness input device at an appropriate aggressiveness setting (e.g., 110% of the speed of the rear traction elements 38). The aggressiveness input device can have a dial with 15 positions spanning a range of aggressiveness settings from 80% to 120% with respect to the speed of the front traction elements 22, 24 relative to the speed of the rear traction elements 38. The center position can correspond to a 1:1 ratio (100%) between the speed of the front traction elements 22, 24 and the speed of the rear traction elements 38. The aggressiveness input device can also have a sensor that generates an aggressiveness signal indicative of the aggressiveness setting, and the aggressiveness signal can be sent to the control unit 92. The sensor can be a binary-coded decimal switch with four digital outputs in binary form (in some embodiments, the sensor may be another type of encoder). The aggressiveness input device can be configured in any suitable manner.

In the constant engine speed embodiment, the input unit 85 can also include the speed input device.

The articulation sensor 88 can be configured to sense an articulation angle between the front and rear sections 12, 14 and to generate an articulation signal indicative of the articulation angle. The articulation sensor 88 can be a rotary encoder (e.g., Hall-effect sensor) mounted on an articulation pin, or mounted on the main frame 18 or the engine frame 32 (e.g., on right side of main frame 18) with a linkage interconnecting the encoder and the other frame 18 or 32 (e.g., the encoder and the engine frame 32). In some embodiments, the articulation sensor 88 can take the form of a cylinder position sensor configured to sense extension and retraction of one of the articulation cylinders 45. In some embodiments, the articulation sensor 88 can take the form of a potentiometer.

The articulation sensor 88 can represent the articulation angle with a voltage signal. The control unit 92 can receive that voltage signal and determine the articulation angle using a look-up table stored in memory, and interpolating as needed. The look-up table can be calibrated with voltages and corresponding articulation angles at the zero position (straight orientation), the full left articulation position, and the full right articulation position (and can assume a linear or other relationship between zero and full articulation).

The steering sensor 90 can be configured to sense a steering angle of the left traction element 22 or the right traction element 24 and to generate a steering signal indicative of the steering angle. For example, the steering sensor 90 can be positioned to sense the steering angle of the right traction element 24 and to generate a steering signal indicative of the steering angle of the right traction element 24. Since the geometry of the steering connection between the left and right traction elements 22, 24 is known, the steering angle of the left traction element 22 can be determined by the control unit 92 from the steering angle of the right traction element 24. The steering sensor 90 can be a rotary encoder (e.g., Hall-effect sensor) positioned at the upper kingpin associated with the right traction element 24, to sense the rotation of that kingpin, or, stated otherwise, the angular displacement of the right spindle relative to the right yoke, with the neutral position being when the right traction element 24 is perpendicular to the axle 27. Such is the angle that can be sensed by the sensor 90. The sensor 90 can represent the steering angle with a voltage signal. It is understood that the rotary encoder may be positioned at either one of the two kingpins of the steering joint associated with either one of the traction elements 22, 24. In some embodiments, the vehicle 10 may have a similar second steering sensor (i.e., a rotary encoder such as, for example, a Hall-effect sensor) positioned in a corresponding location to sense the steering angle of the left traction element 22 (i.e., at the upper kingpin of the left traction element 22) and to generate a steering signal indicative of the steering of the left traction element 22. In some embodiments, either or both of the steering sensor 90 and the second steering sensor (if any) may take the form of a cylinder position sensor configured to sense extension and retraction of one of the steering cylinders, or may take the form of a potentiometer.

The control unit 92 of the vehicle 10 can include one or more electronic controllers. For example, the control unit 92 can include a network of such controllers electrically coupled to one another via a CAN (Controller Area Network) bus. In some embodiments, the control unit 92 can include a single electronic controller.

Each electronic controller can include sufficient processor technology and memory to perform the various activities of the controller. Each controller can include a processor (e.g., microprocessor) and memory coupled electrically to the processor, the memory having stored therein instructions which, when executed by the processor, cause the processor to perform the various activities of the controller.

The control unit 92 can be electrically coupled to the input unit 85, the articulation sensor 88, and the steering sensor 90. The control unit 92 can receive one or more input signals from the input unit 85, the articulation signal from the articulation sensor 88, and the steering signal (or steering signals in the case of two steering sensors) from the steering sensor 90. The control unit 92 can determine a desired speed for the left and right traction elements 22, 24 dependent on the received signals. The control unit 92 can then determine a pump displacement for the pump 72 dependent on the desired speed for the front traction elements 22, 24. The control unit 92 can also determine a first motor displacement for the left motor 58 dependent on the desired speed and a first ratio between a turning radius of the left traction element 22 and a turning radius of the rear section 14; and a second motor displacement for the right motor 60 dependent on the desired speed and a second ratio between a turning radius of the right traction element 24 and the turning radius of the rear section 14. The control unit 92 can be configured to output a pump control signal commanding the pump 72 to the determined pump displacement, a first motor control signal commanding the left motor 58 to the determined first motor displacement, and a second motor control signal commanding the right motor 60 to the determined second motor displacement.

The control unit 92 can be configured to determine the desired speed for the first and second traction elements 22, 24 in a wide variety of ways, using, for example, one or more input signals correspondingly indicative of one or more operational parameters. The applicable input signals depends on the mode of operation of the vehicle 10 selected manually by the operator or automatically. The vehicle 10 can be operated in a front-element-only drive or precision mode in which only the front traction elements 22, 24 are used for propulsion; a rear-element-only drive mode in which only the rear traction elements 38 are used for propulsion; and an all-element drive mode in which all traction elements 22, 24, 38 are used for propulsion of the vehicle 10. A drive-mode selector (e.g., three-position rocker switch) positioned at the operator's station can be operable by a human operator to select one of the drive modes, and to generate a drive-mode selection signal indicative of the selected drive-mode. Since the front traction elements 22, 24 are not driven in the rear-element-only drive mode, that mode is not discussed further.

The precision mode can allow the vehicle 10 to operate at slower speeds than can be achieved by using the transmission 40. It does so by using only the front traction elements 22, 24. In precision mode, a precision mode speed dial (or other precision mode speed input device) can divide certain gear ratios (e.g., forward gear ratios 1-3) into separate speed increments (e.g., 15 speed increments) to provide a precision mode speed setting. The control unit 92 can receive input signals indicative of the precision mode speed setting, the selected gear ratio, and the throttle input device position (indicative of requested engine speed) to help determine the desired speed for the first and second traction elements 22, 24 in the precision mode. In the constant engine speed embodiment, the control unit 92 can also receive the ground speed input device position.

In the all-element drive mode, the speed of the front traction elements 22, 24 can be adjusted relative to the speed of the rear traction elements 38 by use of the aggressiveness setting. The control unit 92 can receive input signals indicative of the aggressiveness setting, the selected gear ratio, and the throttle input device position to help determine the desired speed for the first and second traction elements 22, 24 in the all-element drive mode. Alternatively, the control unit 92 can receive input signals indicative of the aggressiveness setting and the transmission propel output speed to determine the desired speed for the first and second traction elements 22, 24 in the all-element drive mode. The vehicle 10 can be configured without an operator-controlled aggressiveness setting. In the constant engine speed embodiment, the control unit 92 can also receive the ground speed input device position.

The control unit 92 can be configured to determine the pump displacement for the pump 72 dependent on the desired speed for the front traction elements 22, 24. The control unit 92 can be configured to determine a current level of the pump control signal, the current level indicative of the pump displacement. The control unit 92 can be configured to determine the current level using a pre-populated look-up table stored in memory (e.g., during manufacture). The look-up table may be a one-dimensional look-up table with desired speed as the input and current level indicative of pump displacement as the output. The pump displacement current levels populating the table may be pre-selected so as to target an efficient pump/motor relationship for a given desired speed for the front traction elements 22, 24 taking into account the importance of torque at lower working speeds and the importance of speed at higher transport speeds. For a given engine speed, the flow rate driven by the pump 72 can be roughly proportional to the desired speed for the front traction elements 22, 24. The control unit 92 can be configured to determine the current level of the pump control signal so as to produce approximately a predetermined flow rate from the pump 72 in proportion to the desired speed. In some embodiments, the control unit 92 can be configured to determine the current level so as to be proportional to the desired speed for the front traction elements 22, 24.

The control unit 92 can have a look-up table stored in memory to determine the steering angle of the right traction element 24 (i.e., the right steering angle). During calibration, the look-up table can be generated by learning the voltage at three steering positions, i.e., a straight (steering angle is zero degrees), a right full steering position (at the right mechanical steering stop), and a left full steering position (at the left mechanical steering stop), and correlating respectively those voltages to right steering angles of zero degrees, +40 degrees, and −40 degrees (the sign convention of the steering angle can be reversed so long as consistent with the sign convention of the articulation angle) (+40 degrees and −40 degrees are merely non-limiting exemplary values).

When the front traction elements 22, 24 are turned from zero degrees, the inboard front traction element can angle more than the outboard front traction element to discourage skidding. As such, the actual steering angles of the front left and right traction elements 22, 24 at the right full steering position and the left full steering position can be different from +40 degrees and −40 degrees (e.g., the steering angle of the inboard traction element may be less than 40 degrees in the direction of the turn and the outboard wheel may be greater than 40 degrees in the direction of the turn). Nonetheless, +40 degrees and −40 degrees can be used as reasonable engineering approximations of the actual steering angle at the right and left full steering positions. Likewise, interpolated values can be used as reasonable engineering approximations of the actual steering angle at intermediate positions (i.e., at positions between zero degrees and right and left full steering angles). The look-up table can thus be calibrated with three voltage values at the three positions mentioned. Upon receiving a voltage value from the steering sensor 90, the control unit 92 can be configured to determine the proper steering angle using the look-up table and interpolating as needed.

The control unit 92 can be configured to determine the steering angle of the left traction element 22 (i.e., the left steering angle) from the steering angle of the right traction element 24 (i.e., the right steering angle). A left steering angle can be determined from a given right steering angle due to the known geometry of the front wheel assembly. For example, the control unit 92 can have a pre-populated one-dimensional look-up table stored in memory (e.g., during manufacture) and containing the corresponding left steering angles for a given set of right steering angles (e.g., +/−40 degrees at 2.5 degree increments). In some embodiments, the control unit 92 can be configured to calculate the left steering angle for a given right steering angle based on the geometry of the front wheel assembly 44. As alluded to above, in place of a look-up table or a calculation to determine the left steering angle, there can also be a left steering angle sensor configured to sense the left steering angle and to generate a steering angle signal indicative of the left steering angle, in which case the control unit 92 can receive both the steering angle signal indicative of the left steering angle and the steering angle signal indicative of the right steering angle.

The control unit 92 can be configured to determine each of the first and second ratios between a turning radius of the respective traction element 22, 24 and a turning radius of the rear section 14 dependent on the articulation angle and the respective steering angle. The control unit 92 can be configured to determine the first ratio using a pre-populated first ratio look-up table stored in memory (e.g., during manufacture) and the second ratio using a pre-populated second ratio look-up table stored in memory (e.g., during manufacture). Each of the first and second look-up tables can be dependent on the articulation angle and the respective steering angle, and may be configured, for example, as a two-dimensional look-up table with articulation angle along one axis and steering angle along the other axis with ratio values populating the table so as to provide a predetermined ratio value for a given articulation angle and a given steering angle.

Each ratio value is the ratio between a turning radius of the respective traction element 22, 24 and a turning radius of the rear section 14. For example, the turning radii for a number of ratios (e.g., 50), each with a given articulation angle and given steering angle, can be pre-measured. Configured with a given articulation angle and a given steering angle, the vehicle 10 can be driven in a circle on a surface that leaves tire tracks. The turning radius of the left traction element 22 can be measured as the distance from the center of the circle to the center of the track made by the left traction element 22. The turning radius of the right traction element 24 can be measured as the distance from the center of the circle to the center of the track made by the right traction element 24. The turning radius of the rear section 14 can be determined by measuring the distance from the center of the circle to the center of the track made by the left tandem 36 and the distance from the center of the circle to the center of the track made by the right tandem 36 and averaging those two distances so as to yield a turning radius for the rear section 14 at the intersection between the centerline of the rear axle 42 and the fore-aft axis 17. Alternatively, instead of measuring the radii, the diameters can be measured from the respective track center on one side of the circle center to that track center on the opposite side of the circle center, the radii determined by halving such diameter measurements. As such, each ratio look-up table can be populated empirically either completely or partially. In the case of partially populated empirically, each ratio look-up table can be further populated with ratios determined by interpolation or other suitable curve-fitting method using the empirically-derived ratios.

For the given articulation angle and the given steering angle, the look-up table for the left traction element 22 can be pre-populated with the ratio of the turning radius of the left traction element 22 to the turning radius of the rear section 14, and the look-up table for the right traction element 24 can be pre-populated with the ratio of the turning radius of the right traction element 24 to the turning radius of the rear section 14. The ratios of the look-up tables can be determined in this manner for each pair of articulation angle and steering angle over the range of possible articulation angles defined by left and right mechanical stops (e.g., +/−22 degrees at 2.5 degree increments) and possible steering angles defined by left and right mechanical stops (e.g., +/−40 degrees at 2.5 degree increments).

With respect to straight travel, the ratio for each traction element 22, 24 is 1.0. With respect to turning, the ratio for the inboard traction element 22, 24 can be less than 1.0 (e.g., 0.8), and the ratio for the outboard traction element 22, 24 can be greater than 1.0 (e.g., 1.2).

Since the vehicle 10 is articulated and has steerable traction elements 22, 24, straight travel can result when each of the articulation angle and the right steering angle is 0 degrees, i.e., front and rear sections 12, 14 are aligned and front traction elements 22, 24 are in their straight-ahead, neutral position (vehicle is "fully aligned"), or when the articulation angle and the right steering angle are equal in non-zero magnitude but opposite in direction (vehicle 10 is "crabbing"). For example, when crabbing, the front section 12 may be articulated a first magnitude in a first direction relative to the rear section 14 (e.g., 20 degrees to the right) while the right traction element 24 may be steered a second magnitude equal to the first magnitude in a second direction opposite to the first direction (e.g., 20 degrees to the left), resulting in straight travel. The two look-up tables can be pre-populated with a ratio of 1.0 for those combinations of articulation angle and right steering angle resulting in straight travel (i.e., fully aligned or crabbing).

Alternatively, the control unit 92 can sum the articulation angle and the right steering angle. If the sum is zero, the control unit 92 can apply a ratio of 1.0 for each traction element 22, 24 without accessing either look-up table. If the sum is non-zero, the control unit 92 can access the look-up tables and retrieve the applicable ratios for the traction elements 22, 24.

In some embodiments, rather than have the two ratio look-up tables, the control unit 92 can calculate the first ratio and the second ratio dependent on an Ackerman model of the geometry of the steering system of the vehicle 10 for a given articulation angle and given right steering angle. However, since the steering system of the vehicle 10 is not a true Ackerman steering system, the first and second ratios may be accurate for only one turning angle, the rest being an estimate (the turning angle being the sum of the articulation angle and the right steering angle).

The control unit 92 can be configured to determine the first motor displacement of the first motor 58 dependent on a product of the desired speed and the first ratio between a turning radius of the left traction element 22 and a turning radius of the rear section 14, and to determine the second motor displacement of the second motor 60 dependent on a product of the desired speed and the second ratio between a turning radius of the right traction element 24 and a turning radius of the rear section 14.

For example, the control unit 92 can perform closed-loop feedback control of the first and second motor displacements. In such a case, the first speed sensor 94 can sense a rotational first output speed of the left motor 58 and generate a first motor speed signal indicative of the first output speed, and a second speed sensor 96 can sense a rotational second output speed of the right motor 60 and generate a second motor speed signal indicative of the second output speed. Each speed sensor 94, 96 can be, for example, a Hall-effect speed sensor. In some embodiments, each speed sensor can be a variable reluctance speed sensor. The feedback loop can help compensate for calibration errors, manufacturing tolerances, motor efficiency, turning, and possibly tire wear.

The control unit 92 can be coupled electrically to the first and second speed sensors 94, 96 to receive the first and second motor speed signals. The control unit 92 can then determine a first speed setpoint as a product of the desired speed and the first ratio [e.g., first speed setpoint=(desired speed)×(first ratio)], and the first motor displacement using feedback control dependent on the first speed setpoint and the first output speed. The control unit 92 can also determine a second speed setpoint as a product of the desired speed and the second ratio [e.g., second speed setpoint=(desired speed)×(second ratio)], and the second motor displacement using feedback control dependent on the second speed setpoint and the second output speed.

The control unit 92 can be configured to control the error between the first speed setpoint and the first output speed to arrive at the first motor displacement, and the error between the second speed setpoint and the second output speed to arrive at the second motor displacement. The control unit 92 can perform PID (proportional-integral-derivative) control of such errors to arrive at the first and second motor displacements. The integral term can be an electrical current value based on the selected gear ratio (a look-up table can be used by the control unit 92 to determine the integral term as a function of selected gear ratio), and the proportional term can be a constant. In some embodiments, the control unit 92 performs PI (proportional-integral) control of such errors to arrive at the first and second motor displacements.

The control unit 92 can be configured to output a pump control signal commanding the pump 72 to the pump displacement, a first motor control signal commanding the left motor 58 to the first motor displacement, and a second motor control signal commanding the right motor 60 to the second motor displacement. Such control signals are, for example, current signals applied respectively to the solenoid valves of the pump 72, the first motor 58, and the second motor 60. The control unit 92 can determine the current level of each current signal using a respective look-up table stored in memory (e.g., during manufacture) with displacement as the input and current level as the output.

As mentioned above, the control unit 92 can have one or more electronic controllers. For example, the control unit 92 can include a first controller, a second controller, a third controller, and a fourth controller electrically coupled to one another via a CAN bus. The first controller can receive the articulation angle signal from the articulation sensor 88 and the steering angle signal from the steering sensor 90, and correlate those signals to articulation angle and steering angle values, respectively, with corresponding look-up tables stored in its memory, and broadcast those values on the CAN bus. The first controller can have the instructions and look-up tables stored in its memory. The second controller can receive the forward-reverse signal and the gear signal. The third controller can receive the drive-mode selection, the precision mode speed setting, the aggressiveness setting, the first rotational output speed of the first motor 58 from the first speed sensor 94, and the second rotational output speed of the second motor 60 from the second speed sensor 96. The third controller can determine the desired speed, the first and second ratios, the pump displacement, the first and second motor displacements, and the first and second speed setpoints; and output the pump control signal, and the first and second motor control signals. The fourth controller can receive the throttle signal, the engine control mode signal, and the engine speed setting signal (and the ground speed input signal in the case of the constant engine speed embodiment).

In some embodiments, only one of the motors 58, 60 has a variable displacement. In such a case, the other motor 58, 60 can have a fixed displacement. Either one of the motors 58, 60 can have a variable displacement, although it may be more efficient computationally for the motor associated with the traction element having its steering angle measured by the steering sensor 90 to have the variable displacement (e.g., the motor 60).

Figure 3:
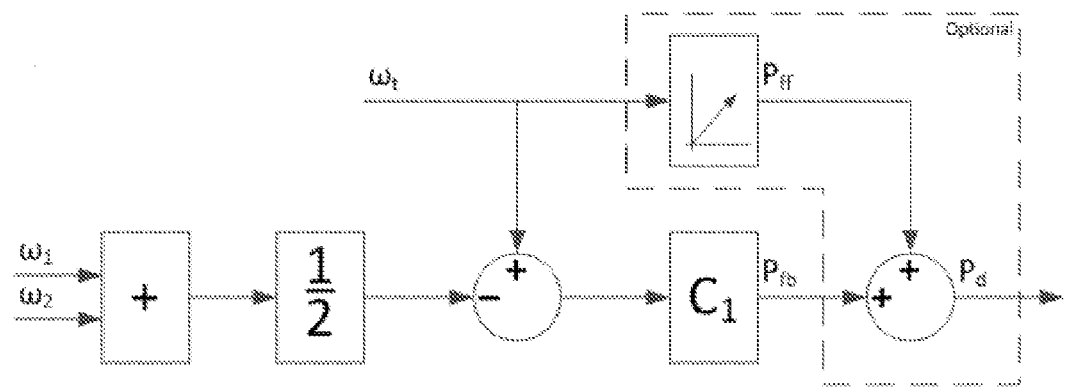
FIG. 3 illustrates an exemplary method for determining a pump displacement command.

FIG. 3 illustrates an exemplary method for computing the pump displacement commands for the pump 72. The inputs to the system include the current speed $\omega_1$ of the left motor 58, the current speed $\omega_2$ of the right motor 60, and the desired speed $\omega_t$ for the front left and right motors 58, 60. The speed of the motors 58, 60 and the speed of the front traction elements 22, 24 are related taking into account any gear ratios or other factors between the motors and the traction elements. In some embodiments, the current speeds $\omega_1$ and $\omega_2$ can be provided by the speed sensors 94, 96, respectively. The desired speed $\omega_t$ can be determined in various ways depending on the mode of operation of the vehicle and other factors.

In a first embodiment, a motor speed discrepancy is computed as the difference between the average of the current speeds $\omega_1$ and $\omega_2$ and the desired speed $\omega_t$. A pump control routine $C_1$ takes this motor speed discrepancy and outputs a pump feedback command $P_{fb}$ that is sent to adjust the displacement of the hydraulic pump 72. In an alternative embodiment, a pump feed forward command $P_{ff}$ is also derived from the desired speed $\omega_t$; and the sum of the pump feed forward command $P_{ff}$ and the pump feedback command $P_{fb}$ is sent to adjust the displacement of the hydraulic pump 72.

In a FWD-and-RWD mode, the desired speed $\omega_t$ for the front left and right motors 58, 60 can be computed as:

$\omega_t$=(speed of rear traction elements 38)
x (adjustment ratio of traction element to motor rpm)
x (aggressiveness percentage setting)

In a FWD-only mode, the desired speed $\omega_t$ can be a look-up table value based on the operator selected speed range and the throttle input device setting (e.g., accelerator pedal percentage).

Figure 4:
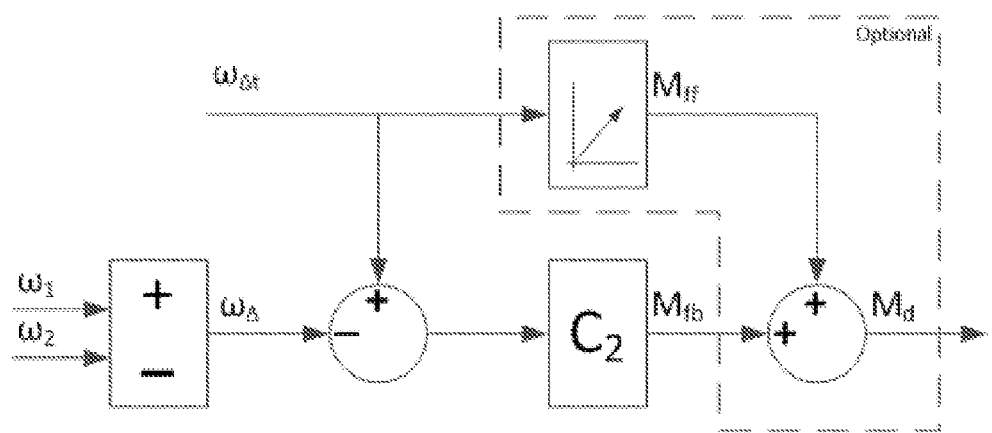
FIG. 4 illustrates an exemplary method for determining a motor displacement command.

FIG. 4 illustrates an exemplary method for computing the motor displacement commands for the front left and right motors 58, 60 where the left motor 58 is a variable displacement motor and the right motor 60 is a fixed displacement motor. The inputs to the system include the current speed $\omega_1$ of the left motor 58, the current speed $\omega_2$ of the right motor 60, and the desired speed differential $\omega_{At}$ for the front left and right motors 58, 60. In a first embodiment, an actual speed differential $\omega_A$ for the front motors 58, 60 is computed as the difference between the actual speeds $\omega_1$ and $\omega_2$. The difference between the actual speed differential $\omega_A$ and the desired speed differential $\omega_{At}$ for the front motors 58, 60 is computed and input to a motor control routine $C_2$ that determines a motor feedback command $M_{fb}$ that is sent to adjust the displacement of the front left variable displacement motor 58. In an alternative embodiment, a motor feed forward command $M_{ff}$ is derived from the desired speed differential $\omega_{At}$ for the motors 58, 60; and the sum of the motor feed forward command $M_{ff}$ and the motor feedback command $M_{fb}$ is sent to adjust the displacement of the front left variable displacement motor 58.

The desired speed differential $\omega_{At}$ for the front motors 58, 60 can be computed based on the front steering angle and the articulation steering angle, for example as:

$\omega_{At}$=(front steering angle)−(articulation steering angle)

The front steering angle and the articulation steering angle can be determined, for example, by readings from the steering sensor 90 and the articulation angle sensor 88, respectively.

Some vehicles can have more than two bi-directional motors coupled fluidly in series with one another and the bi-directional pump (e.g., a turf mower with only three ground-engaging wheels can have three such motors, a respective one for each wheel). In such a case, the pump and one or more of the motors can have a variable displacement.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A vehicle, comprising:
   a first traction element coupled to the vehicle;
   a second traction element coupled to the vehicle;
   a variable displacement pump;
   a bi-directional variable displacement first motor coupled to the first traction element;
   a bi-directional second motor coupled to the second traction element;
   a steering sensor configured to sense a first steering angle indicative of a steering angle of the first traction element; and
   a control unit configured to:
   receive one or more input signals;
   determine a second steering angle indicative of a steering angle of the second traction element based on the first steering angle;
   determine a desired speed for the first and second traction elements based on the one or more input signals;
   determine a pump displacement for the pump based on the desired speed;
   determine a first motor displacement for the first motor based on the desired speed; and
   output a pump control signal commanding the pump to the determined pump displacement, and a first motor control signal commanding the first motor to the determined first motor displacement;
   wherein the pump and the first and second motors are coupled fluidly in series with one another.

2. The vehicle of claim 1, wherein the second motor is a fixed displacement motor.

3. The vehicle of claim 1, wherein the second motor is a variable displacement motor.

4. The vehicle of claim 1, wherein the pump is a bi-directional pump.

5. The vehicle of claim 1, further comprising:
   a first speed sensor configured to sense a rotational output speed of the first motor and generate a first motor speed signal indicative of the output speed of the first motor; and
   a second speed sensor configured to sense a rotational output speed of the second motor and generate a second motor speed signal indicative of the output speed of the second motor;
   wherein the control unit is configured to receive the first and second motor speed signals; and determine the pump displacement and the first motor displacement based on the first and second motor speed signals.

6. The vehicle of claim 5, wherein the control unit is configured to determine an average motor speed based on the first and second motor speed signals, and determine the pump control signal based on the average motor speed.

7. The vehicle of claim 6, wherein the control unit is configured to determine a speed differential based on the first and second motor speed signals, and determine the first motor control signal based on the speed differential.

8. The vehicle of claim 1, wherein the vehicle is an articulated vehicle comprising a front section and a rear section, the rear section being articulated to the front section, and the vehicle further comprises:
   an axle coupled to the front section, the first traction element being coupled to one end of the axle and the second traction element being coupled to the opposite end of the axle, both traction elements being steerable relative to the axle;
   an articulation sensor configured to sense an articulation angle between the front section of the vehicle and the rear section of the vehicle, and generate an articulation signal indicative of the articulation angle; and
   wherein the steering sensor is configured to generate a steering signal indicative of the first steering angle, wherein the first and second traction elements are steerably coupled to one another, and
   wherein the control unit is configured to receive the articulation signal and the steering signal, determine a first ratio between a turning radius of the first traction element and a turning radius of the rear section based on the articulation and steering signals, determine a second ratio between a turning radius of the second traction element and the turning radius of the rear section based on the articulation and steering signals; and determine the first motor displacement based on the first and second ratios.

9. The vehicle of claim 8, wherein the control unit is configured to determine the first motor displacement based on a product of the desired speed and the first ratio.

10. The vehicle of claim 8, further comprising:
    a first speed sensor configured to generate a first motor speed signal indicative of an output speed of the first motor; and
    wherein the control unit is configured to receive the first motor speed signal, determine a first speed setpoint based on a product of the desired speed and the first ratio, and determine the first motor displacement based on a difference between the first speed setpoint and the output speed of the first motor.

11. A control method for a vehicle drive system, the vehicle comprising first and second traction elements coupled to the vehicle, a variable displacement pump, a bi-directional variable displacement first motor coupled to the first traction element, and a bi-directional second motor coupled to the second traction element, the pump and the first and second motors being coupled fluidly in series with one another; the control method comprising:
    receiving one or more input signals;
    receiving a first steering signal indicative of a steering angle of the first traction element;
    determining a second steering angle indicative of a steering angle of the second traction element based on the first steering signal;
    determining a desired speed for the first and second traction elements based on the one or more input signals;
    determining a pump displacement for the pump based on the desired speed;
    determining a first motor displacement for the first motor based on the desired speed; and
    outputting a pump control signal commanding the pump to the determined pump displacement, and a first motor control signal commanding the first motor to the determined first motor displacement.

12. The control method of claim 11, wherein the vehicle is an articulated vehicle comprising a front section and a rear section, the rear section being articulated to the front section, the first and second traction elements being coupled to the front section, and the first and second traction elements being steerably coupled to one another; and the control method further comprises:
    sensing an articulation angle between the front section of the vehicle and the rear section of the vehicle;
    generating an articulation signal indicative of the articulation angle;

determining a first ratio between a turning radius of the first traction element and a turning radius of the rear section based on the articulation signal and the first steering signal;

determining the first motor displacement based on the first ratio;

determining a second ratio between a turning radius of the second traction element and the turning radius of the rear section based on the articulation signal and the second steering angle;

determining a second motor displacement for the second motor based on the second ratio; and outputting a second motor control signal commanding the second motor to the determined second motor displacement.

13. The control method of claim 12, further comprising:
determining the first motor displacement based on a product of the desired speed and the first ratio; and
determining the second motor displacement based on a product of the desired speed and the second ratio.

14. The control method of claim 12, further comprising:
receiving a first motor speed signal indicative of an output speed of the first motor;
receiving a second motor speed signal indicative of an output speed of the second motor;
determining a first speed setpoint based on a product of the desired speed and the first ratio;
determining the first motor displacement based on a difference between the first speed setpoint and the output speed of the first motor;
determining a second speed setpoint based on a product of the desired speed and the second ratio; and
determining the second motor displacement based on a difference between the second speed setpoint and the output speed of the second motor.

15. A control method for a vehicle drive system, the vehicle comprising first and second traction elements coupled to the vehicle, a variable displacement pump, a bi-directional variable displacement first motor coupled to the first traction element, and a bi-directional second motor coupled to the second traction element, the pump and the first and second motors being coupled fluidly in series with one another; the control method comprising:

receiving one or more input signals;
sensing a rotational output speed of the first motor;
generating a first motor speed signal indicative of the output speed of the first motor;
sensing a rotational output speed of the second motor;
generating a second motor speed signal indicative of the output speed of the second motor;
determining a desired speed for the first and second traction elements based on the one or more input signals;
determining a pump displacement for the pump based on the desired speed and the first and second motor speed signals,
determining a first motor displacement for the first motor based on the desired speed and the first and second motor speed signals; and
outputting a pump control signal commanding the pump to the determined pump displacement, and a first motor control signal commanding the first motor to the determined first motor displacement.

16. The control method of claim 15, further comprising:
determining an average motor speed based on the first and second motor speed signals; and
determining the pump control signal based on the average motor speed.

17. The control method of claim 15, further comprising:
determining a speed differential based on the first and second motor speed signals; and
determining the first motor control signal based on the speed differential.

* * * * *